United States Patent [19]

Kniat

[11] 4,055,997
[45] Nov. 1, 1977

[54] MEANS FOR CALCULATING TURBINE INLET TEMPERATURE OF A GAS TURBINE ENGINE

[75] Inventor: John Kniat, Glastonbury, Conn.

[73] Assignee: United Technologies Corporation, Hartford, Conn.

[21] Appl. No.: 723,364

[22] Filed: Sept. 15, 1976

[51] Int. Cl.² .................................... G01M 15/00
[52] U.S. Cl. ................................ 73/117.3; 73/346
[58] Field of Search ............... 73/117.3, 346, 345; 60/39.28 T

[56] References Cited

U.S. PATENT DOCUMENTS

| | | | |
|---|---|---|---|
| 2,809,492 | 10/1957 | Arkawy | 60/39.28 T |
| 3,377,848 | 4/1968 | Marvin | 73/117.3 |
| 3,789,665 | 2/1974 | Hohenberg | 73/346 |

Primary Examiner—Richard C. Queisser
Assistant Examiner—Anthony V. Ciarlante
Attorney, Agent, or Firm—Norman Friedland

[57] ABSTRACT

Turbine inlet temperature of a gas turbine engine is calculated from compressor discharge temperature, total and static pressures and total fuel metered to the engine by combining a sensed engine temperature with a derived fuel/air ratio and from the empirical burner can temperature rise equation solving for the turbine inlet temperature value.

4 Claims, 2 Drawing Figures

MEANS FOR CALCULATING TURBINE INLET TEMPERATURE OF A GAS TURBINE ENGINE

BACKGROUND OF THE INVENTION

This invention relates to gas turbine engines and particularly to means for calculating the temperature at the inlet of the turbine.

As is well known in the gas turbine technology the measurement of turbine inlet temperature has long been sought after. The problems with obtaining the actual measurement, amongst others, are the unreliability of temperature sensors, the irregular temperature pattern, etc, associated with a hostile environment. Typically, this value has been predicted or empirically surmised by scheduling fuel as a function of certain predetermined engine operating parameters. For example, fuel controls like the JFC-25, JFC-60 and others manufactured by the Hamilton Standard Division of United Technologies Corporation, schedule fuel flow in accordance with $W_f/P_3 \times P_3$ where $W_f$ is fuel in pounds per hour and $P_3$ is compressor discharge pressure in pounds per square inch. The $W_f/P_3$ value is manifested as a function of speed in RPM of the rotating machinery and $P_3$ is directly sensed and these values are directly multiplied to obtain fuel flow for steady state engine operation. For acceleration the $W_f/P_3$ is manifested as a function of compressor speed and compressor inlet pressure or temperature and the $P_3$ sensed value is likewise multiplied to limit the fuel flow.

The measurement of the turbine inlet temperature would be a better parameter for temperature limiting than the method described above as well as any other heretofore known system.

This invention contemplates manifesting a turbine inlet temperature value by sensing certain engine parameters and computing them into a substituted value of the turbine inlet temperature which is a close proximity to if not its actual value. The contemplated system incorporates certain constants which can be calibrated in each installation to "zero in" the calculated temperature to the actual temperature. According to this invention air to fuel ratio is computed by measuring fuel flow $(W_f)$, static compressor discharge pressure $(P_{S3})$, total compressor discharge pressure $(P_3)$, and total compressor discharge temperature $(T_3)$ which is then computed to provide engine air flow $(W_a)$. Engine fuel flow $(W_f)$ is then ratioed to provide an air to fuel ratio value. This ratio value together with compressor discharge temperature are "plugged" into the empirical burner can temperature rise equation $$T_4 = T_3 + K_1(K_2T_3 + K_3)f/a + K_4$$

programmed into a computer, (digital or analogue) for calculating the $T_4$ value. $K_1$, $K_2$, $K_3 + K_4$ are calibration constants and $K_4$ may be used, in this instance to adjust for deviations between calculated and actual ($T_4$) temperature values for a given engine installation.

SUMMARY OF THE INVENTION

An object of this invention is to provide for a gas turbine engine improved means for deriving turbine inlet temperature.

A still further object of this invention is to provide, for a gas turbine engine, computer means responding to certain engine operating parameters to provide a calculated fuel to air ratio and this calculated value together with burner inlet temperature is calculated to provide a substitute measurement indicative of turbine inlet temperature. This invention contemplates using an analogue or digital computer programmed to calculate the empirical burner can temperature rise equation.

DESCRIPTION OF THE PREFERRED EMBODIMENT

Figure 1:
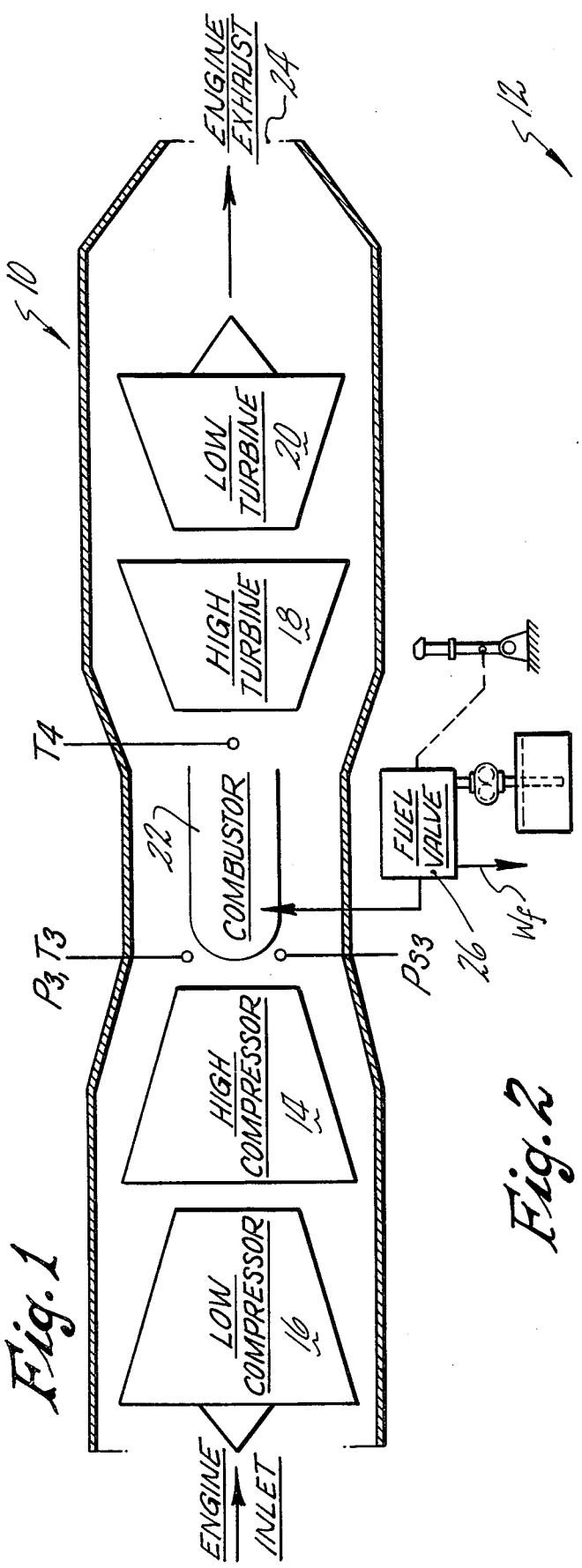
FIG. 1 is a schematic illustration of a gas turbine engine.
Figure 2:
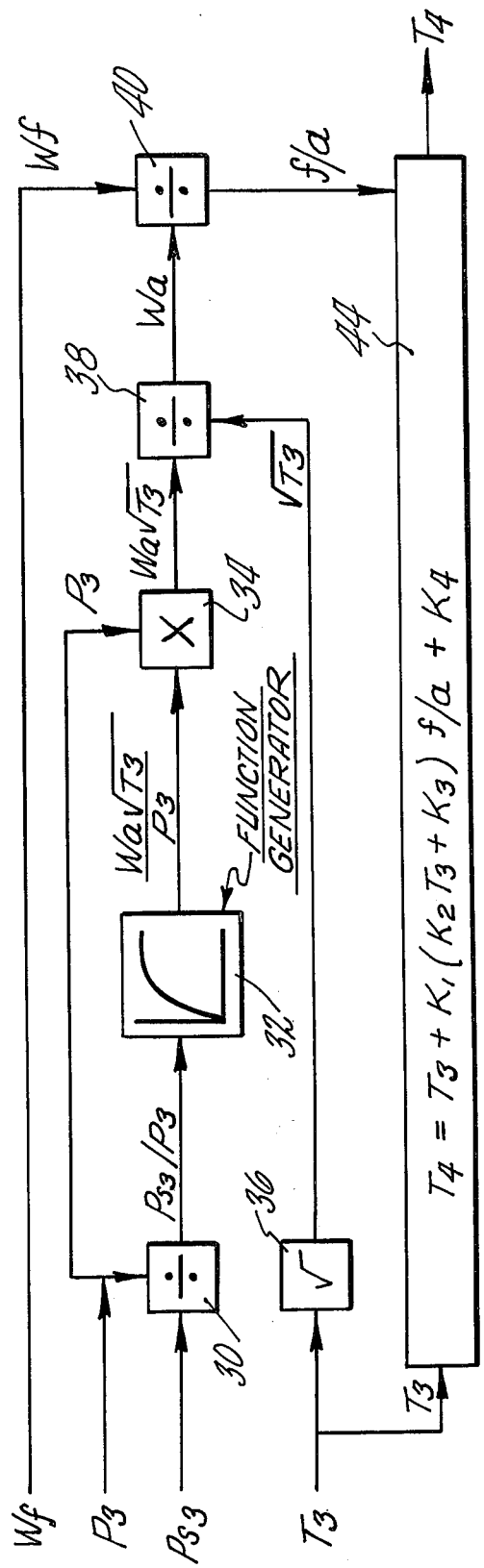
FIG. 2 is a block diagram showing calculations performed for obtaining the substantial temperature value.

The invention can best be understood by referring to FIGS. 1 and 2 showing schematically a typical twin spool gas turbine engine 10 and a flow diagram of computer 12 which computes $T_4$ from the sensed parameters. It should be understood that this invention has application to all other types of gas turbine power plants where the value of turbine inlet temperature is desired, and although the parameters selected are those indicative of providing a fuel/air ratio value, other parameters as one skilled in the art may appreciate could likewise be selected to obtain this ratio.

Typically, the gas turbine engine includes high and low compressors 14 and 16 driven by high and low turbines 18 and 20 respectively. Combustor 22 adds heat by burning fuel to accelerate the mass which after driving the turbines exhausts through the exhaust section 24. A suitable fuel control 26 serves to meter the fuel in a well known manner to obtain the proper engine operations.

The gas turbine engine and fuel control are all well known in the art and are not deemed part of this invention and for the sake of simplicity and clarity the details are omitted from herein. Suffice it to say, that the fuel control meters the desired amount of fuel through a suitable fuel valve for providing desired engine operation.

According to this invention, the temperature at the combustor exit ($T_4$) is measured by a substitute measurement using parameters from the lower temperature combustor inlet and calibrations of the combustor fuel-air ratio.

As can be seen from FIG. 2 a suitable computer which can be any well known type and although an electronic computer of the general purpose type may be preferred, the invention as one skilled in the art will appreciate need not be limited thereto. The parameters for determining the fuel/air ratio of the combustor, compressor discharge total and static pressures ($P_3$ and $P_{S3}$ respectively), compressor total temperature ($T_3$) and total fuel flow ($W_f$), are all fed to the computer as indicated. $P_3$ and $P_{S3}$ are divided at computer element 30 and the output is fed to a suitable function generator 32 where this value is corrected for the pressure and temperature level at the combustor inlet. The output from function generator 32 produces a corrected air flow value $$\frac{(W_a\sqrt{T_3})}{P_3}$$

which is multiplied in computer element 34 to multiply out the $P_3$ value. The air flow value ($W_a$) is then obtained by dividing out the $\sqrt{T_3}$ value derived by measuring $T_3$ and computed to its square root value by the square root computer 36 and then divided out at divider 38. The fuel air ratio $(f/a)$ is derived by dividing $W_f$ by $W_a$ in divider 40. The fuel flow value $(W_f)$ is derived by sensing the position of fuel valve 26 in a well known manner and transducing the value by a commercially available resoluter to a signal that will be accommodated by the computer.

From the $f/a$ and $T_3$ values the $T_4$ is then obtained by the calculation performed by computer 44 which essentially solves the empirical burner can temperature rise equation:

$$T_4 = T_3 + K_1(K_2T_3 + K_3)f/a + K_4$$

As noted from the foregoing, $T_4$ value obtained from this computation is a substitute for direct measurement of the actual value of $T_4$. Obviously the design constants $K_1$, $K_2$, $K_3$, and $K_4$ can be selected to "zero in" the actual $T_4$ value by adjustments made when on the test rig prior to being installed in an aircraft.

It should be understood that the invention is not limited to the particular embodiments shown and described herein, but that various changes and modifications may be made without departing from the spirit or scope of this novel concept as defined by the following claims.

I claim:

1. Means for ascertaining the turbine inlet temperature of a gas turbine engine including computing means responsive to compressor discharge total and static pressure for producing a first signal indicative of the ratio thereof, function generator means responsive to said first signal for producing a second signal indicative of corrected air flow at the burner of said engine, computer means responsive to said second signal and compressor discharge total pressure and total temperature for producing a third signal indicative of air flow at the burner, means responsive to said third signal and fuel flow to said burner for producing a fourth signal indicative of the fuel-air ratio at the burner and means responsive to said fourth signal and compressor discharge total temperature for producing an output signal indicative of turbine inlet temperature.

2. Means as defined in claim 1 including a computer means for multiplying, dividing and square rooting said compressor discharge total pressure and temperature for producing said third signal.

3. Means as defined in claim 1 wherein said last mentioned means includes computing means resolving the equation:

$$T_3 + K_1(K_2T_3 + K_3)f/a + K_4$$

where $T_3$ = total burner inlet temperature
$f/a$ = fuel to air ratio at the burner, and
$K_1$, $K_2$, $K_3 + K_4$ = design constants.

4. The method of calculating the turbine inlet temperature of a gas turbine engine including the steps of:
  computing a ratio whose value indicative of compressor discharge static to total pressure,
  generating a function of said ratio obtained in the step of computing indicative of corrected air flow in the burner,
  computing the air flow value obtained in the step of generating that function by eliminating the correction values,
  dividing the value obtained in the step of computing the air flow value by the actual amount of fuel being metered to the engine,
  computing the value of turbine inlet temperature by resolving the equation:

$$T_3 + K_1(K_2T_3 + K_3)f/a + K_4$$

where $T_3$ = total burner inlet temperature
$f/a$ = fuel to air ratio at the burner, and
$K_1$, $K_2$, $K_3 + K_4$ = design constants.

* * * * *